No. 8,569. PATENTED DEC. 2, 1851.

T. T. STRODE.
MACHINE FOR BORING HOLES IN POSTS.

UNITED STATES PATENT OFFICE.

THOS. T. STRODE, OF COATESVILLE, PENNSYLVANIA.

MACHINE FOR BORING HOLES IN POSTS.

Specification of Letters Patent No. 8,569, dated December 2, 1851.

*To all whom it may concern:*

Be it known that I, THOMAS T. STRODE, of Coatesville, in the county of Chester and State of Pennsylvania, have invented a new and useful Improvement in the Machine for Boring Holes in Posts for Fencing; and I do hereby declare the following to be a full and clear description of the construction and operation thereof, reference being had to the annexed drawings, making part of this specification.

Figure 1:
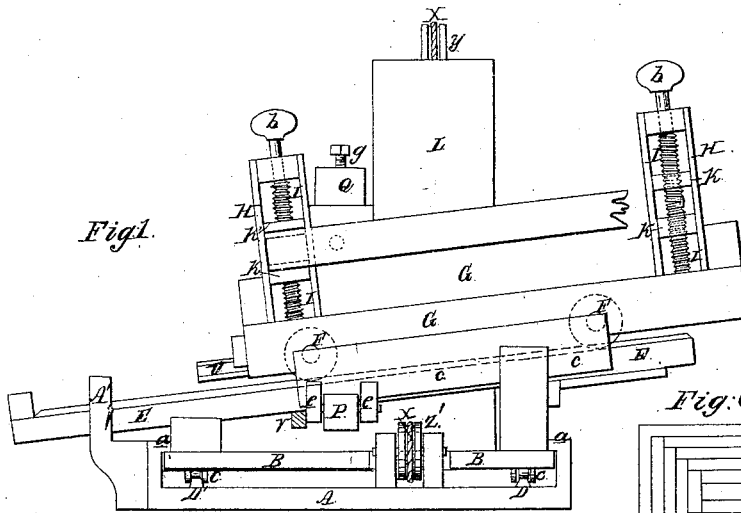
Figure 2:
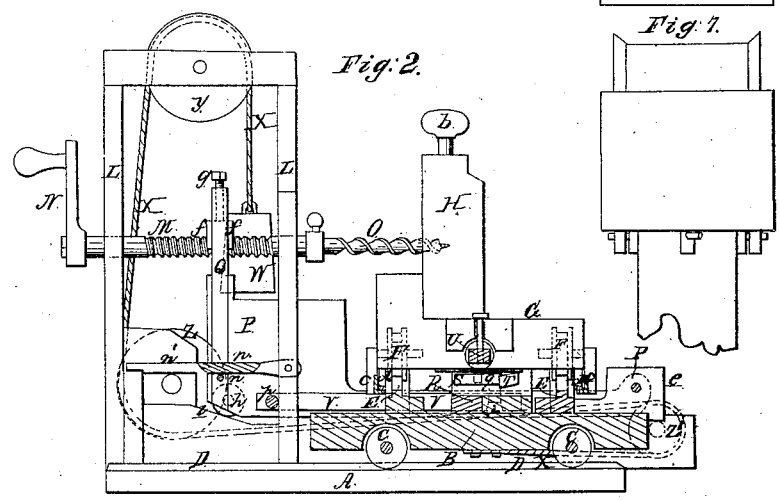
Figure 3:
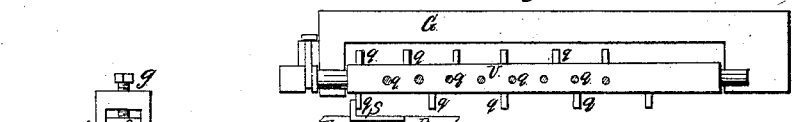
Figure 5:
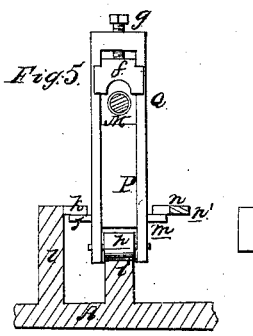
Figure 4:
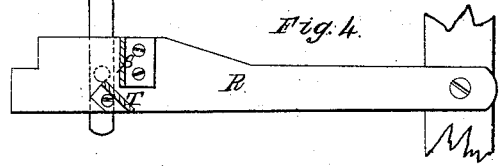

Figure 1, represents a front elevation of the machine. Fig. 2, is an elevation of the left side of the machine. Fig. 3, is a sectional view, showing the gage bar for regulating the movement of the upper carriage. Fig. 4, is a vertical view of the pivoted bar of the lower carriage showing the catch or stop plates thereon against which the pins of the regulating bar of the upper carriage act. Fig. 5, is a vertical sectional view showing an end view of the beam with its roller and inverse screw nut for matching with the propelling screw shaft of the auger.

Where the same letters of reference occur on the several figures they indicate the same parts.

My invention and improvement consists in combining an upper inclined carriage to which the timber to be bored, is clamped, with a horizontal carriage, having a movement toward and from the boring tool, whereby the upper inclined carriage is made to have a lateral movement at right angles to the boring tool for the purpose of adjusting the timber to the auger when required to bore holes at suitable distances for mortises or otherwise.

My improvement also consists in combining a pivoted bar of the lower carriage, provided with a catch and incline plate with a gage bar mounted in bearings in the underside of the inclined carriage whereby the action of the latter is regulated in moving the timber laterally at right angles to the boring tool, in boring a series of holes, the receding movement of the lower carriage actuating the said pivoted bar, to clear the catch plate from the pins of the gage bar, and the descent of the gage bar with its carriage causes the pins of the latter to strike against the inclined plate of the pivoted bar and thus move the latter so, that the next pin of the said gage bar shall strike against the catch plate and hold the upper inclined carriage until the next hole shall have been bored.

My improvement also relates to the arrangement and combination of a pivoted feed beam with the propelling screw shaft, whereby the carriages are made to advance until the auger shall have entered the timber, when the inner end of the pivoted beam will be elevated by means of an inclined plane and thus disengage the said beam from the propelling screw shaft and allow the carriages to advance by the action of the auger, and recede after the hole shall have been bored.

A is the frame.

B is the carriage provided at either end with a pair of rollers C C, mounted upon horizontal parallel ways D, D, of the frame A over which they move with the carriage B which is held down by projecting ribs $a\ a$ of the frame. Upon this carriage B is placed parallel inclined ways E upon which is mounted the supporting rollers F of an inclined carriage G, which is held upon the inclined ways E by means of side plates $c\ c$ fitting beneath plates $d\ d$ projecting from the inclined ways E.

From either end of the carriage G projects a clamp frame H, within which is mounted a right and left screw I having its lower bearing in the carriage G, and the upper ends thereof being furnished with thumb nuts $b\ b$ whereby they are turned. Each of these screws I is provided with two clamps K K made to approach and recede from each other by the screws and between the ends thereof are clamped the timber to be bored, in such a position that the center of the timber will be presented to the boring tool during the lateral movement of the carriage. From the rear portion of the frame A projects upward a box frame L within which is mounted in suitable bearings a horizontal screw shaft M, provided at its outer end with a crank handle N whereby it is rotated (or a pulley from which a band may lead to the propelling power) and to the opposite end thereof is confined the boring tool O.

P is a horizontal beam pivoted to two cleats $e\ e$ attached to the ways E of the carriage B and extending rearward through an opening in the frame L whereby it is prevented from moving laterally and provided with an upward projecting bar Q in the top whereof is confined an inverse screw nut $f$ rendered adjustive by a screw $g$, for matching with the horizontal screw shaft M whereby the carriages with the timber are made to advance toward the boring tool until the latter enters the timber when the inverse screw nut $f$ is disengaged from the screw shaft M by means of a roller $h$, passing over an inclined plane $i$ on the frame A, whereby the said pivoted beam P, with its inverse screw nut $f$, is elevated as shown in Fig. 5. The inverse screw nut $f$ is retained in gear with the propelling screw shaft M while the carriage approaches the boring tool by means of a pin $j$ projecting from the beam P, beneath a flange $k$ (Fig. 5,) extending from an elevated portion $l$ of the frame A, said pin $j$ being relieved therefrom when the pivoted beam P commences to rise to disengage its inverse screw nut $f$ from the screw shaft M. The pivoted beam P, is retained in an elevated position by means of a pin $m$ projecting from the side thereof, and catching over the end of a portion $n$, of a pivoted arm $n'$ and resting thereon until the carriages recede to bore another hole when the pin $m$ passes over the end of the portion $n$ and allows the pivoted beam P to descend and thus again engage the inverse screw $f$ with the propelling shaft M.

To the carriage B, and between the ways E, is pivoted at one of its ends a bar R, furnished with a catch plate S, and angular or inclined plate T, the object of which is to allow the carriage G, to descend at regular intervals in boring a series of holes in the following manner.

Beneath the carriage G, is confined in suitable bearings a central bar U having its sides furnished with a series of pins $q$ at suitable distances apart which are made to catch against the catch or stop plate S of the pivoted bar R and thus hold the carriage G in that position until the hole shall have been bored and the carriages made to recede when the lower end of the pivoted bar R will be made to move toward the boring tool in the same proportion as the carriages recede and thus relieve the pin $q$ of the gage bar U from the catch plate S, and allows the carriage G to descend and at the same time so act upon the inclined plate T as to move the pivoted bar R frontward so that the next pin $q$ shall strike the catch plate S and arrest the descent of the carriages. To the lower end of the movable bar R is pivoted the end of a long arm V, which extends horizontally rearward through an opening in the frame L and is provided with a pin $p$ (Fig. 2,) which catches against the inside of the frame L and holds the arm V, and pivoted bar R during the receding movement of the carriages until the pin $q$ of the gage bar U passes between the end of the catch plate S and inclined plate T, (Fig. 4). The receding movement of the carriages is affected by means of a weight W or its equivalent attached to a cord X passing up over a pulley Y, in the top of the frame L and beneath a pulley Z and thence beneath the inclined ways E over a pulley Z′ attached to the front of the frame A and is then fastened to the underside of said carriage B.

The operation of the machine is as follows: The timber or post to be bored being properly clamped between the clamps K of the right and left screws I, I, and the carriages B G, adjusted in the required position. Motion is communicated to the propelling screw shaft M which causes the carriages to advance toward the boring tool $o$ until the latter enters the material and the pin $j$ having passed beneath the flange $k$ the roller $h$ of the pivoted beam P will then pass over the inclined plane $i$ and elevate said beam P and thus disengage the inverse screw nut $f$ from the propelling screw shaft M and allow the auger to advance the carriages as the hole is bored, after which the carriages are made to recede with the timber from the boring tool $o$, until the latter shall have cleared the timber during which time the pivoted beam P will have been retained in an elevated position by the pin $m$ passing over the portion $n$ of the pivoted arm $n'$ and allowed to descend and engage the inverse screw nut $f$ with the propelling shaft M.

Simultaneously with the receding movement of the carriages the pin $p$ of the arm V will strike against the inside of the frame L and prevent the lower end of the pivoted bar R from moving with the carriages until the pin $q$ represented as resting against the plate S of the gage bar U passes from the catch plate S and bears against the inclined plate T and as the screw shaft M again commences to advance the carriages, the pin of the long arm V will also be moved from the contact with the inside of the frame and thus allow the pin $q$ of the gage bar acting against the inclined plate T to force the end of the pivoted bar frontward which brings the catch plate in a position to catch against the next pin $q$ of the gage bar U and thus arrest the descent of the carriage G in a position to bore the next hole in the manner above stated, till the last hole is being bored when the upper carriage comes in contact with a brake handle attached to the power machinery and disengages it from the fastening holding up one end of said brake and lets the brake fall on the driving wheel of said power machinery, this brake being of sufficient weight to check the power, then after the power is checked and the last hole has been bored and the carriages receded from the auger, they are arrested in their outward motion by the upper carriage coming in contact with an upright piece attached to the lower frame A and thereby preventing the inverse screw nut $f$ from connecting with the propelling screw shaft M and arrests the motion of the carriages while the bored timber is removed and fresh timber replaced then the upper carriage is run up the inclined ways by hand as far as needed which disengages the upper carriage from the afore mentioned upright piece or stop A' attached to frame A and allows the inverse screw nut to come in contact with the propelling shaft M and commence boring as before.

The pins $q$ on each side of the gage bar U may be arranged at different distances apart, and either side the bar may be turned so as to present either row of pins to the action of the catch or stop plates S whereby holes may be bored at any required distance apart.

Figure 6:
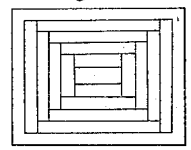
Figure 7:
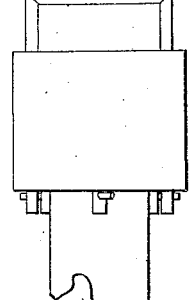

Figs. 6 and 7 represent an end and side view of the rectangular socketed chisel used for squaring holes in pieces of timber after they have been bored by the auger. The chisels cutting across the grain of the wood are somewhat longer than those cutting with the grain.

The socket and shank are cast in one piece, the wedges for securing the chisels or cutters may be made of wood, iron or any suitable material. Various size chisels are adapted to and secured in said socket for cutting various sized holes by having various sized wedges inserted inside and outside the chisels for cutting different sized holes.

Having thus described my improvements on the machine for boring holes in posts for fencing, what I claim therein as new and desire to secure by Letters Patent, is—

1. Combining the pivoted bar R provided with a catch and inclined plate S T, and long arm V and stop or pin $p$ with the gage bar U provided with rows of pins $q$ and mounted in bearings in the inclined carriage G, whereby the movement of the latter is regulated in moving the timber laterally in boring a series of holes as described in the specification.

2. I also claim the combination of the pivoted beam P, inclined plane $b$, inverse half nut screw $f$ and propelling screw shaft M whereby the carriages are made to advance toward the boring tool and is disengaged for the purpose and in the manner described and represented.

I do not however intend to confine my claim to the precise construction described in the foregoing specification, but to use such a form of construction, as may be the best adapted to accomplish the desired object by means substantially the same; neither do I claim any portion of the machine above described, that has been practised successfully by others prior to its being invented by myself.

In testimony whereof I have hereunto signed my name before two subscribing witnesses.

THOMAS T. STRODE.

Witnesses:
  A. E. H. JOHNSON,
  WM. M. SMITH.